US010382302B2

(12) United States Patent
Sugimoto (10) Patent No.: US 10,382,302 B2
(45) Date of Patent: Aug. 13, 2019

(54) ELECTRONIC APPARATUS AND NON-TRANSITORY COMPUTER READABLE RECORDING MEDIUM SUITABLE FOR ACQUIRING STATUS INFORMATION

(71) Applicant: KYOCERA Document Solutions Inc., Osaka (JP)

(72) Inventor: Kensaku Sugimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 53 days.

(21) Appl. No.: 15/719,313

(22) Filed: Sep. 28, 2017

(65) Prior Publication Data

US 2018/0091402 A1 Mar. 29, 2018

(30) Foreign Application Priority Data

Sep. 28, 2016 (JP) ................. 2016-190048

(51) Int. Cl.
*H04L 12/26* (2006.01)
*G06F 8/60* (2018.01)
*H04L 29/08* (2006.01)

(52) U.S. Cl.
CPC ............ *H04L 43/0817* (2013.01); *G06F 8/60* (2013.01); *H04L 67/34* (2013.01)

(58) Field of Classification Search
CPC ........ H04L 43/0817; H04L 67/34; G06F 8/60
See application file for complete search history.

(56) References Cited

U.S. PATENT DOCUMENTS

| 5,580,177 | A | * | 12/1996 | Gase | G06F 3/1204 |
| | | | | | 358/1.15 |
| 7,010,624 | B1 | * | 3/2006 | Zhou | G06F 9/4413 |
| | | | | | 710/15 |
| 2004/0093491 | A1 | * | 5/2004 | Ebata | G06F 9/4411 |
| | | | | | 713/100 |
| 2004/0210897 | A1 | * | 10/2004 | Brockway | G06F 9/4411 |
| | | | | | 717/174 |
| 2007/0288754 | A1 | * | 12/2007 | Kaji | H04L 67/14 |
| | | | | | 713/175 |
| 2009/0204730 | A1 | * | 8/2009 | Mochizuki | G06F 9/453 |
| | | | | | 710/19 |

FOREIGN PATENT DOCUMENTS

JP 2014-191508 A 10/2014

* cited by examiner

*Primary Examiner* — Viva Miller
(74) *Attorney, Agent, or Firm* — Hawaii Patent Services; Nathaniel K. Fedde; Kenton N. Fedde (57) ABSTRACT

Provided is an electronic apparatus that, even when extensions increase, acquires status information in a short time, and suppresses an increase in capacity of a storage device that stores firmware. A status-information-acquisition unit executes applications that are stored in an HDD (storage device) and downloaded from a cloud server (application-providing server), and acquires status information of each of the extensions. A system-control unit transmits the status information to a status-monitoring server, and deletes applications that are stored in the HDD (storage device). As a result, it is not necessary to re-create firmware for acquiring status information of each of the respective extensions, and it is possible to suppress an increase in the data size of applications incorporated in the firmware.

3 Claims, 6 Drawing Sheets

(EXAMPLE OF SETTING CONTENTS)                                   ~117a (SETTING 1)
ADDRESS INFORMATION OF APPLICATION
ACQUISITION DESTINATION
http://xxx/yyy (SETTING 2)
APPLICATION ACQUISITION TIMING
DAILY AT 1:00PM (SETTING 3)
APPLICATIONS TO ACQUIRE
a, d, e

ELECTRONIC APPARATUS AND NON-TRANSITORY COMPUTER READABLE RECORDING MEDIUM SUITABLE FOR ACQUIRING STATUS INFORMATION

INCORPORATION BY REFERENCE

This application is based on and claims the benefit of priority from Japanese Patent Application No. 2016-190048 filed on Sep. 28, 2016, the contents of which are hereby incorporated by reference.

BACKGROUND

The present disclosure relates to an electronic apparatus and a non-transitory computer readable recording medium that are suitable for acquiring status information.

For example, in an image forming apparatus that is a MFP (Multifunction Peripheral) such as a multifunction printer, combination machine or the like, there are models that are equipped with a printing function, a copying function, a FAX function, a data transmitting and receiving function via a network and the like. These functions are executed based on respective dedicated software, however, it is expected that functions will continue to increase in the future. Moreover, firmware for causing hardware to operate according to respective functions is updated to the latest version, for example, by downloading via a network.

Incidentally, in maintenance management of an image forming apparatus, a method is proposed in which a monitoring server or the like periodically acquires status information of the various functions and the like of the image forming apparatus via a network. However, in this method, when the image forming apparatus side is not operating (for example, a state in which the electric power is OFF), the monitoring server or the like is not able to acquire status information from the image forming apparatus.

In order to eliminate such a problem, in typical technology, there are image forming apparatuses that transmit status information based on schedule information. In other words, the image forming apparatus includes an agent unit that transmits status information to a remote maintenance server on a maintenance service provider side. The agent unit acquires transmission-schedule information for the status information from the remote maintenance server, and operating-schedule information on the image forming apparatus side, and based on both the transmission-schedule information and the operating-schedule information, sets transmission timing for the status information. Then, at the transmission timing, the agent unit transmits status information to the remote maintenance server.

SUMMARY

The electronic apparatus according to an embodiment of the present disclosure includes a system-control unit, a storage device, and a status-information-acquisition unit. The system-control unit downloads applications from an application-providing server for acquiring status information for each extension. The storage device stores the downloaded applications. The status-information-acquisition unit executes the applications and acquires status information of the extensions. The system-control unit transmits the status information to a status-monitoring server, and deletes the applications that are stored in the storage device.

The non-transitory computer readable recording medium according to an embodiment of the present disclosure stores an application-control program that can be executed by a computer of an electronic apparatus. When the application-control program is executed, the computer, by a system-control unit, downloads applications from an application-providing server for acquiring status information for each extension. Then by a storage device, stores the downloaded applications. The computer, by a status-information-acquisition unit, executes the applications and acquires status information of the extensions. Then, by the system-control unit, transmits the status information to a status-monitoring server, and after transmitting the status information, deletes the applications that are stored in the storage device.

DETAILED DESCRIPTION

In the following, an embodiment of an electronic apparatus according to the present disclosure will be explained with reference to FIG. 1 to FIG. 5. In the following explanation, a MFP (Multifunction Peripheral) that is a combination peripheral machine having, for example, a printing function, a copying function, a FAX function and a data transmitting and receiving function via a network and the like is given as an example of an electronic apparatus.

Figure 1:
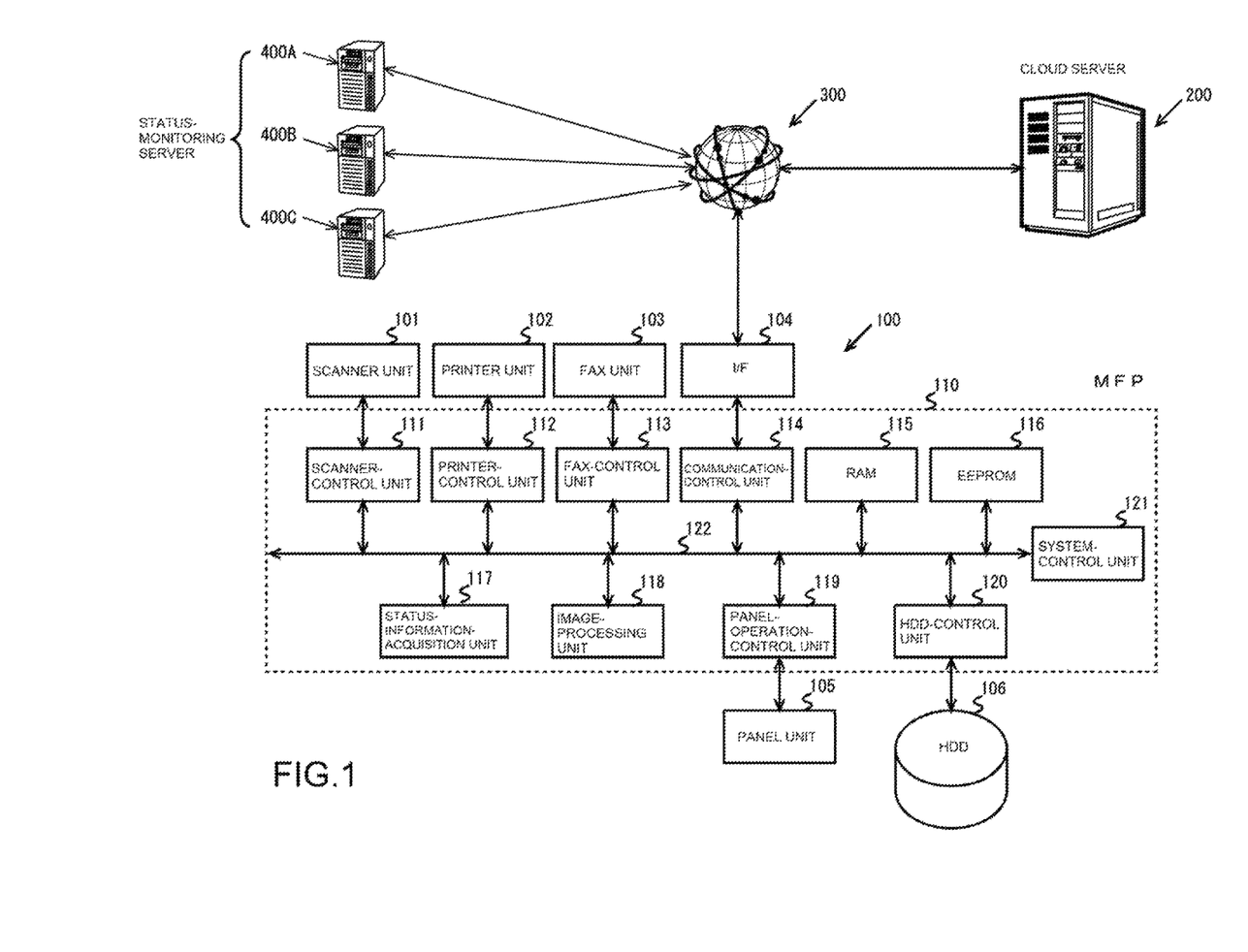
FIG. 1 illustrates an embodiment for the case in which the electronic apparatus according to the present disclosure is applied to an MFP.

First, as illustrated in FIG. 1, an MFP 100 is connected to a cloud server 200 and status-monitoring servers 400A to 400C via a network 300 such as the Internet. In FIG. 1, the case of one MFP 100 is illustrated, however, there could also be plural MFPs 100. Moreover, FIG. 1 illustrates the case of one cloud server 200, however, there may also be plural cloud servers 200. Moreover, in FIG. 1, the case of three status-monitoring servers 400A to 400C is illustrated, however the number of status-monitoring servers 400A to 400C could also be two or less or four or more.

Figure 2A:
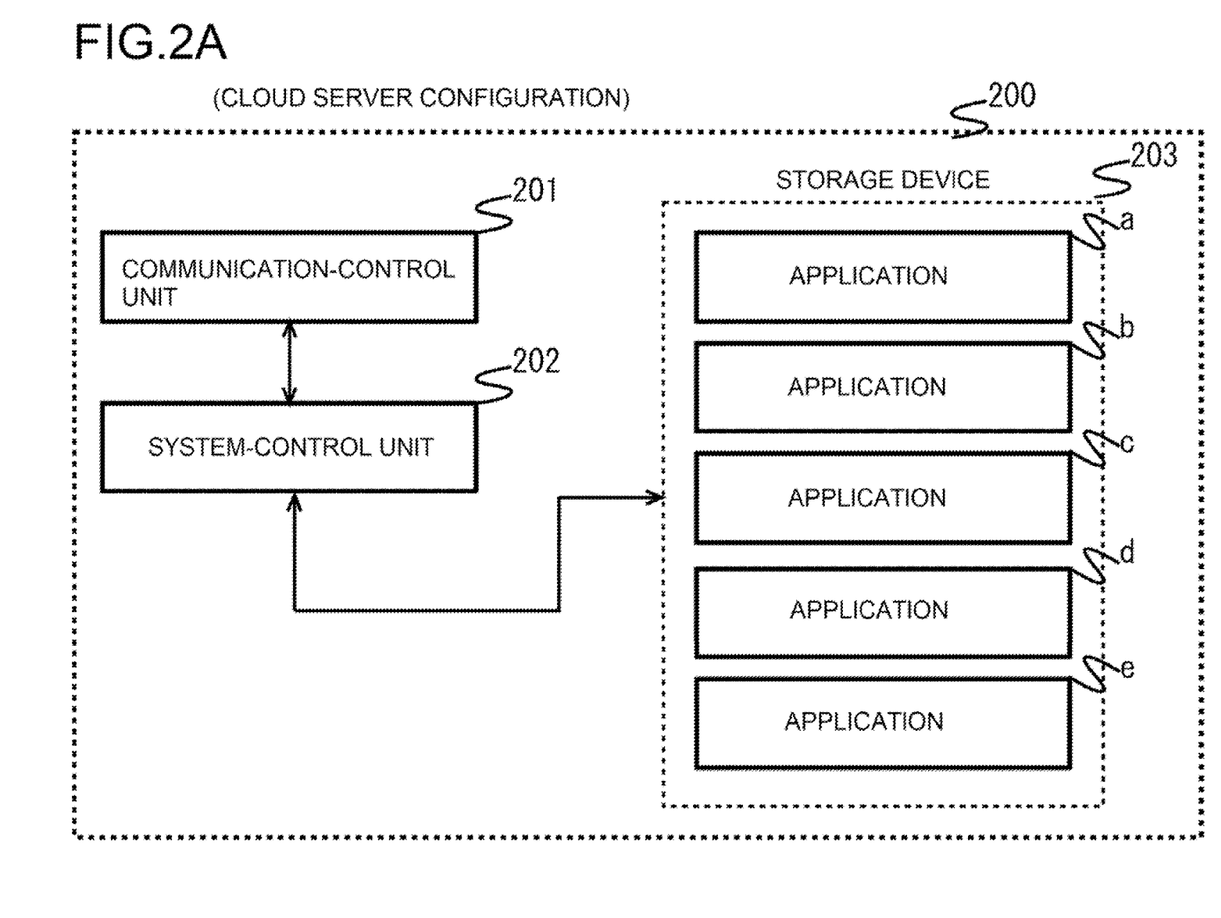
FIG. 2A illustrates an overview of the configuration of the cloud server in FIG. 1.

Here, the cloud server 200, as illustrated in FIG. 2A has a communication-control unit 201, a system-control unit 202, and a storage device 203. The storage device 203 stores various applications a to e for acquiring status information for extensions, for example, on the MFP 100 side. Extensions means functions such as functions by optional equipment that is attached to the MFP 100 later, or customized functions related to printing and the like. Applications a to e may or may not include applications that are incorporated in the MFP 100 firmware beforehand. When the applications that are incorporated in the MFP 100 firmware beforehand are included in the applications a to e, the applications a to e that are incorporated in the firmware become unnecessary, and it is possible to reduce the data size of the firmware.

Application a, for example, acquires status information for a job separator for sorting printed paper. Application b, for example, acquires status information of a finisher that is capable of a process of sorting and stapling each set of printed papers. Application c, for example, acquires status information of a printing mechanism accompanying an increase in the size and type of paper that can be printed. Application d, for example, acquires status information of a printing mechanism accompanying an increase in colors that are used in color printing. Application e, for example, acquires status information of an IC card authentication kit accompanying an addition of IC card authentication. The applications a to e are not limited to those described here, and may also acquire status information of other extensions.

Figure 2B:
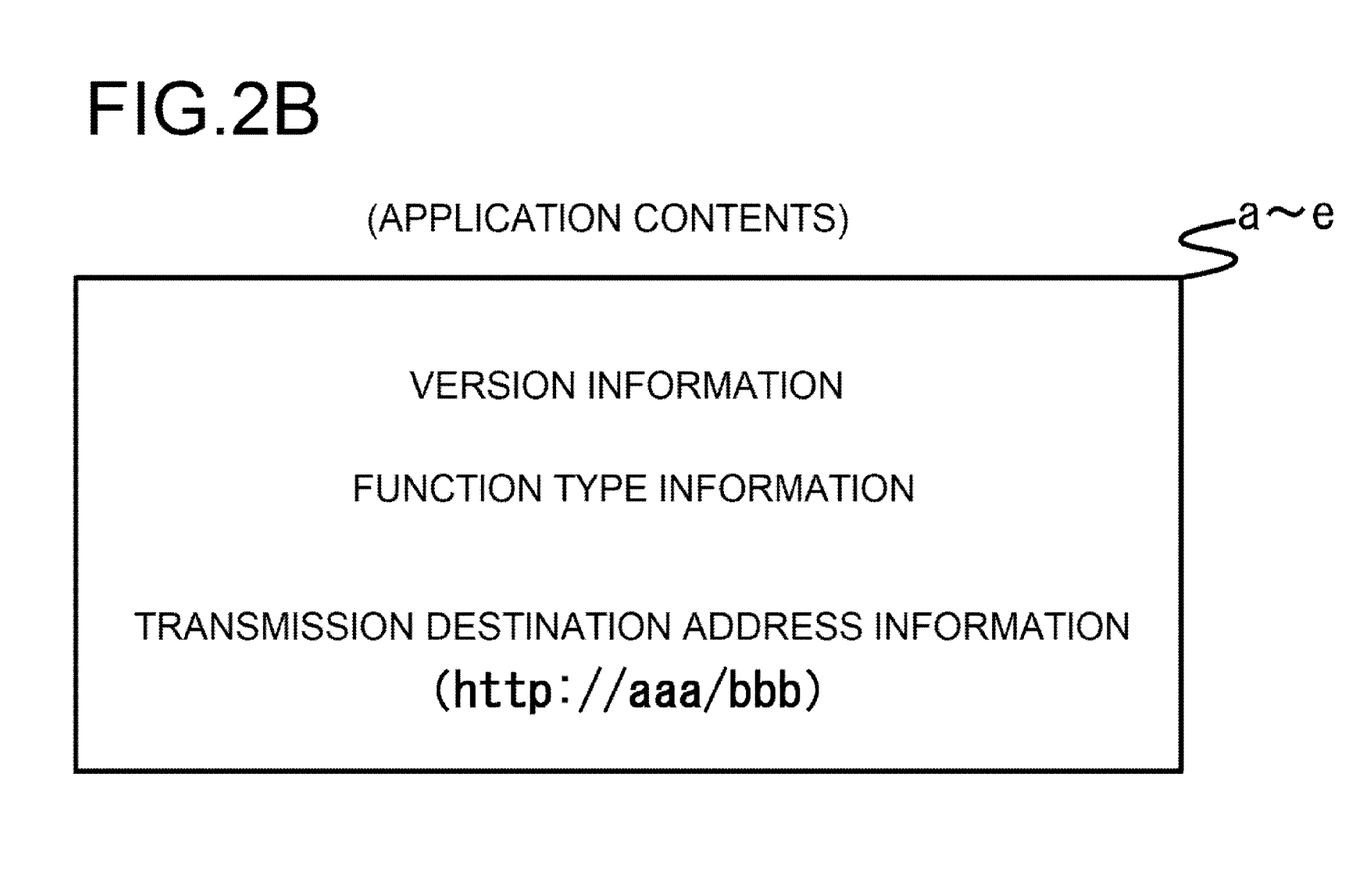
FIG. 2B illustrates the contents of an application that is stored in the storage device in FIG. 2A.

Moreover, applications a to e, as illustrated in FIG. 2B, include version information, function-type information, transmission-destination-address information and the like. The version information includes a revision number and the like. The function-type information includes information that indicates the extension for which status information is to be acquired and the like. The transmission-destination-address information includes address information (for example, http://aaa/bbb) of status-monitoring servers 400A to 400C that are the transmission destinations for acquired status information. By including address information (for example, http://aaa/bbb) of the status-monitoring servers 400A to 400C that are the transmission destination in applications a to e in this way, a setting for the transmission destination of the acquired status information becomes unnecessary on the MFP 100 side. Moreover, on the manager side that manages the cloud server 200 or status-monitoring servers 400A to 400C, status information from the MFP 100 side can be collected by one of the preset status-monitoring servers 400A to 400C, so maintenance management of the MFP 100 can be easily performed.

The communication-control unit 201 receives a transmission request for applications a to e from the MFP 100. The system-control unit 202, according to a transmission request from the MFP 100, transmits applications a to e that are stored in the storage device 203.

Figure 3:
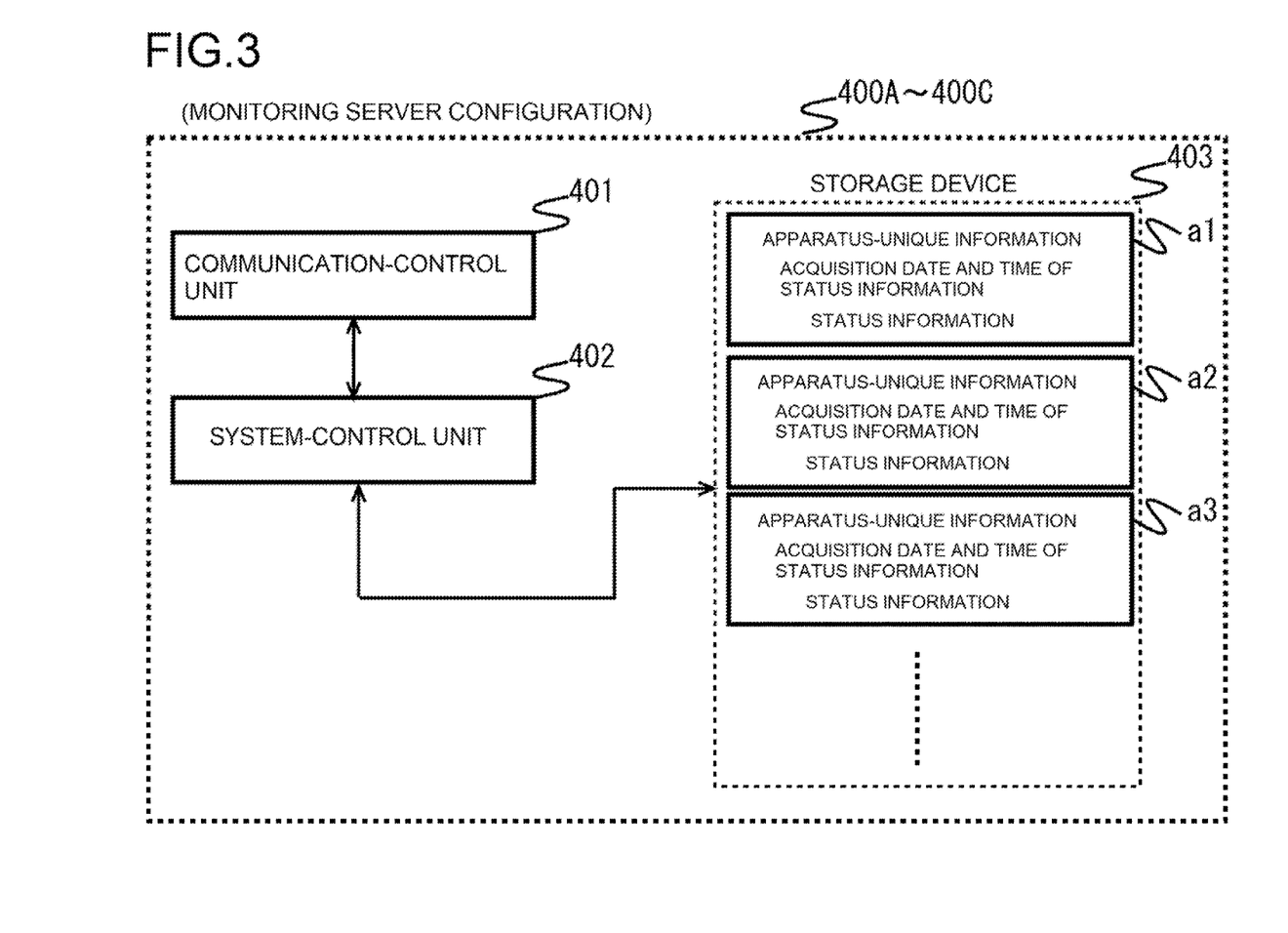
FIG. 3 illustrates an overview of the configuration of the status-monitoring server in FIG. 1.

The status-monitoring servers 400A to 400C, as illustrated in FIG. 3, has a communication-control unit 401, a system-control unit 402, and a storage device 403. The storage device 403 stores status-acquisition information a1 to a3 that includes status information acquired from the MFP 100 side. The status information that is transmitted from the MFP 100 side includes apparatus-unique information for identifying the MFP 100. Moreover, the status-acquisition information a1 to a3, in addition to status information and apparatus-unique information, includes the acquisition date and time of the status information from the MFP 100 side, The communication-control unit 401 acquires status information from the MFP 100. The system-control unit 202 causes the status information that is acquired by the communication-control unit 401 to be stored in the storage device 403 as status-acquisition information a1 to a3.

The MFP 100, as illustrated in FIG. 1, includes a control unit 110 that controls the operation of the scanner unit 101, the printer unit 102, the FAX unit 103, the I/F (interface) 104, the panel unit 105 and the HDD 106.

The scanner unit 101 is a device that converts an image of a document that is read by an image sensor to digital image data, and inputs that data to the control unit 110. The printer unit 102 is a device that, based on printing data that is outputted from the control unit 110, prints an image on paper. The FAX unit 103 is a device that transmits data that is outputted from the control unit 110 to a facsimile of another party over telephone lines, and receives data from a facsimile of another party and inputs that data to the control unit 110.

The I/F 104 is connected to the cloud server 200 and the status-monitoring servers 400A to 400C via a network 300. The I/F 104 may take charge of communication with other MFPs, user terminals and the like, and may take charge of communication with a contents server, web server and the like. The panel unit 105 is a device such as a touch panel that performs a display for the printing function, copying function, FAX function, data transmitting and receiving function via a network 300, and various settings of the MFP 100. The HDD 106 is a storage device that stores application programs and the like for providing the various functions of the MFP 100. Moreover, the HDD 106 has user boxes that store printing jobs that are registered from a user terminal and data that corresponds to printing that is in page-description language.

The control unit 110 is a processor that performs control of the overall operation of the MFP 100 by executing application programs such as a authentication program and the like, an image-forming program, a control program and the like. The control unit 110 includes a scanner-control unit 111, a printer-control unit 112, a FAX (Facsimile) control unit 113, a communication-control unit 114, RAM (Random Access Memory) 115, EEPROM (Electrically Erasable Programmable Read-only Memory) 116, status-information-acquisition unit 117, image-processing unit 118, panel-operation-control unit 119, HDD-control unit 120, and system-control unit 121. Moreover, these units are connected to a data bus 122.

The scanner-control unit 111 controls the reading operation by the scanner unit 101. The printer-control unit 112 controls the printing operation by the printer unit 102. The FAX control unit 113 controls the transmitting and receiving operation by the FAX unit 103. The communication-control unit 114, via the I/F 104, performs control of transmitting and receiving data and the like over a network 300.

The RAM 115 is a work memory for executing programs. The RAM 115 stores printing data that has undergone image processing by the image-processing unit 118. The EEPROM 116 stores a control program for checking the operation of each unit. Moreover, the EEPROM 116 stores firmware for operating the scanner unit 101, printer unit 102, FAX unit 103, I/F (interface) 104, panel unit 105, HDD 106 and the like. Applications for acquiring individual information related to the basic functions of the MFP 100, for example the printing function, copying function, FAX function, data transmitting and receiving function via a network and the like, and status information such as paper-count information, and usage information about consumables such as toner and the like are incorporated in the firmware.

Figure 4:
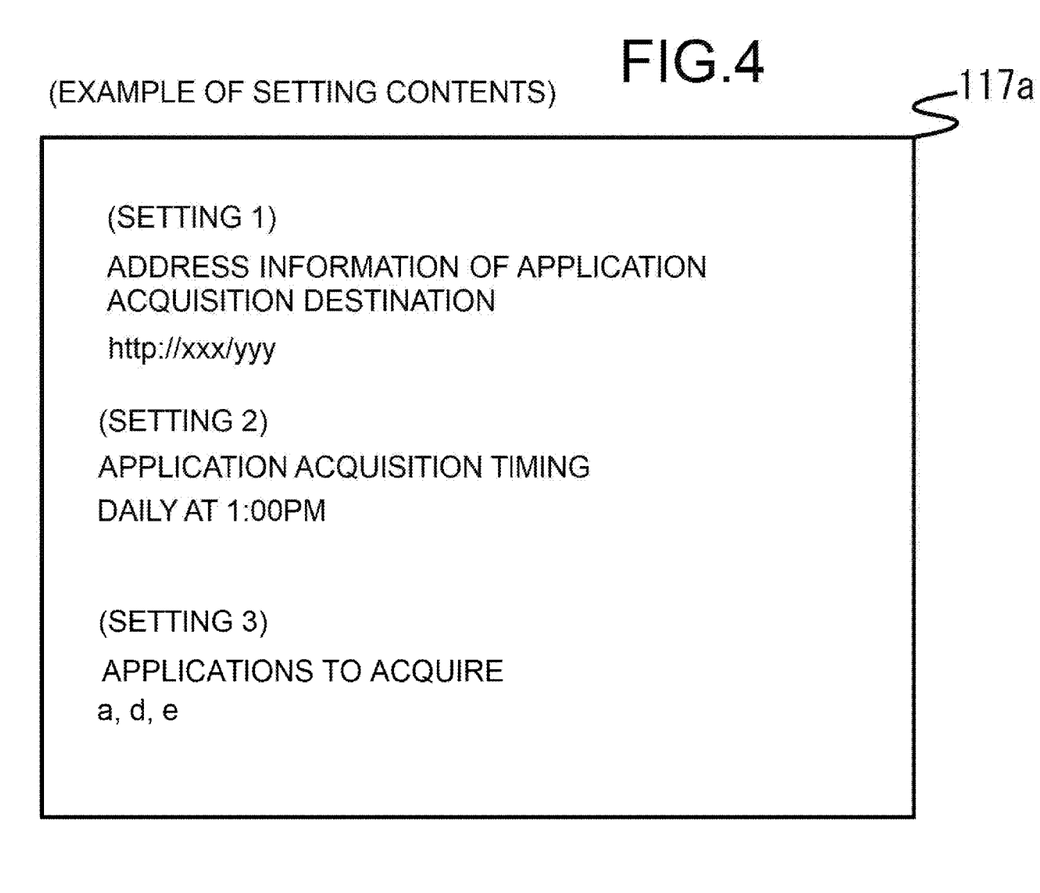
FIG. 4 illustrates an example of the setting contents related to acquiring an application that is set on the MFP side in FIG. 1.

The status-information-acquisition unit 117 manages application-acquisition-setting information 117a illustrated in FIG. 4. The application-acquisition-setting information 117a includes information that indicates settings 1 to 3, for example, that are received by the panel-operation-control unit 119 via the panel unit 105. Setting 1 indicates address information (for example, http://xxx/yyy) of the cloud server 200, for example, that is the acquisition destination of the applications a to e. Setting 2 indicates the acquisition timing (for example, daily at 1:00 pm) of the applications a to e. Setting 3 indicates, for example, applications a, d, e to be acquired. When setting the applications a, d, e to be acquired, it is possible to use the application name, or identifying information such as an ID number or the like that is assigned to each application a, d, e.

Moreover, the setting of the address information of setting 1 (for example, http://xxx/yyy) can be arbitrarily changed. In other words, when there is a plurality of cloud servers 200 as acquisition destinations of applications a to e, it is possible to set address information of an arbitrary cloud server 200. Moreover, the address information of setting 1 may be arbitrarily set for each application a, d, e that is acquired by setting 3. Furthermore, the setting for the acquisition timing of setting 2 (for example, daily at 1:00 pm) can be arbitrarily changed. Moreover, the setting for the applications a, d, e that are acquired in by setting 3 can be arbitrarily changed according to extensions that are added to the MFP 100.

Furthermore, the status-information-acquisition unit 117, based on an instruction from the system-control unit 121, acquires status information for the basic functions of the MFP 100 by executing the applications that are incorporated in the firmware. Moreover, the status-information-acquisition unit 117 acquires status information for the extensions of the MFP 100 by executing the applications a to e that are downloaded from the cloud server 200.

The image-processing unit 118 performs image processing (rasterization) on image data that is read by the scanner unit 101. The image-processing unit 118 also performs image processing (rasterization) on data that is the object of printing that is registered in a user box of the HDD 106. The system-control unit 121 temporarily stores printing data that has undergone image processing by the image-processing unit 118 in the RAM 115.

The panel-operation-control unit 119 controls the display operation by the panel unit 105. Moreover, the panel-operation-control unit 119, via the panel unit 105, receives the start of printing, copying, a FAX, data transmitting or receiving via a network 300, and the like. The panel-operation-control unit 119, via the panel unit 105, also receives setting information for settings 1 to 3 described above.

The system-control unit 121 controls cooperative operations of each of the units. Moreover, when copying, printing or the like is selected via the panel unit 105, the system-control unit 121, via the scanner-control unit 111 or printer-control unit 112, controls reading a document by the scanner unit 101 or printing on paper by the printer unit 102. Furthermore, when there is an instruction to set the application-acquisition-setting information 117a via the panel unit 105, the system-control unit 121 causes the panel-operation-control unit 119 to receive the setting via the panel unit 105.

Moreover, the system-control unit 121 monitors the application-acquisition-setting information 117a that is managed by the status-information-acquisition unit 117. When the timing is the acquisition timing of setting 2 (for example, daily at 1:00 pm), the system-control unit 121 sends a transmission request to the cloud server 200 that corresponds to the address information of setting 1 for applications a, d, e, for example, that are acquired in setting 3.

Moreover, the system-control unit 121 causes the applications a to e that are downloaded from the cloud server 200 to be stored temporarily in the HDD 106. The system-control unit 121 may also cause the applications a to e that are downloaded from the cloud server 200 to be stored in the EEPROM 116. Furthermore, the system-control unit 121 instructs the status-information-acquisition unit 117 to acquire status information of extensions of the MFP 100 based on applications a to e that are downloaded from the cloud server 200. The system-control unit 121 also instructs the communication-control unit 114 to transmit status information to the status-monitoring servers 400A to 400C that correspond to the address information (for example, http://aaa/bbb) of the transmission destinations that are included in the applications a to e. In this case, the system-control unit 121 instructs the communication-control unit 114 to include apparatus-unique information in the status information.

In regard to downloading applications a to e from the cloud server 200, the applications a, d, e, for example, that are set by setting 3, can be executed all at once. However, when taking into consideration the area of the HDD 106, for example, that is used for storing the applications a, d, e that are downloaded, the applications may be executed sequentially. In other words, the system-control unit 121, for example, causes application a that is downloaded to be stored temporarily in the HDD 106. Then, when the status-information-acquisition unit 117 acquires status information based on application a, the system-control unit 121 transmits the acquired status information to the status-monitoring server 400A to 400C that corresponds to the address information (for example, http://aaa/bbb), and deletes the application a that is stored in the HDD 106. Continuing, the system-control unit 121 downloads application d, and the status-information-acquisition unit 117 acquires status information based on application d. Then, the system-control unit 121 transmits the acquired status information to the status-monitoring server 400A to 400C that corresponds to the address information (for example, http://aaa/bbb), and deletes the application d that is stored in the HDD 106. After that, by similarly executing processing for application e, the system-control unit 121 can handle the applications a, d, e to be downloaded one at a time, and it is possible to reduce the area used in the HDD 106.

Figure 5:
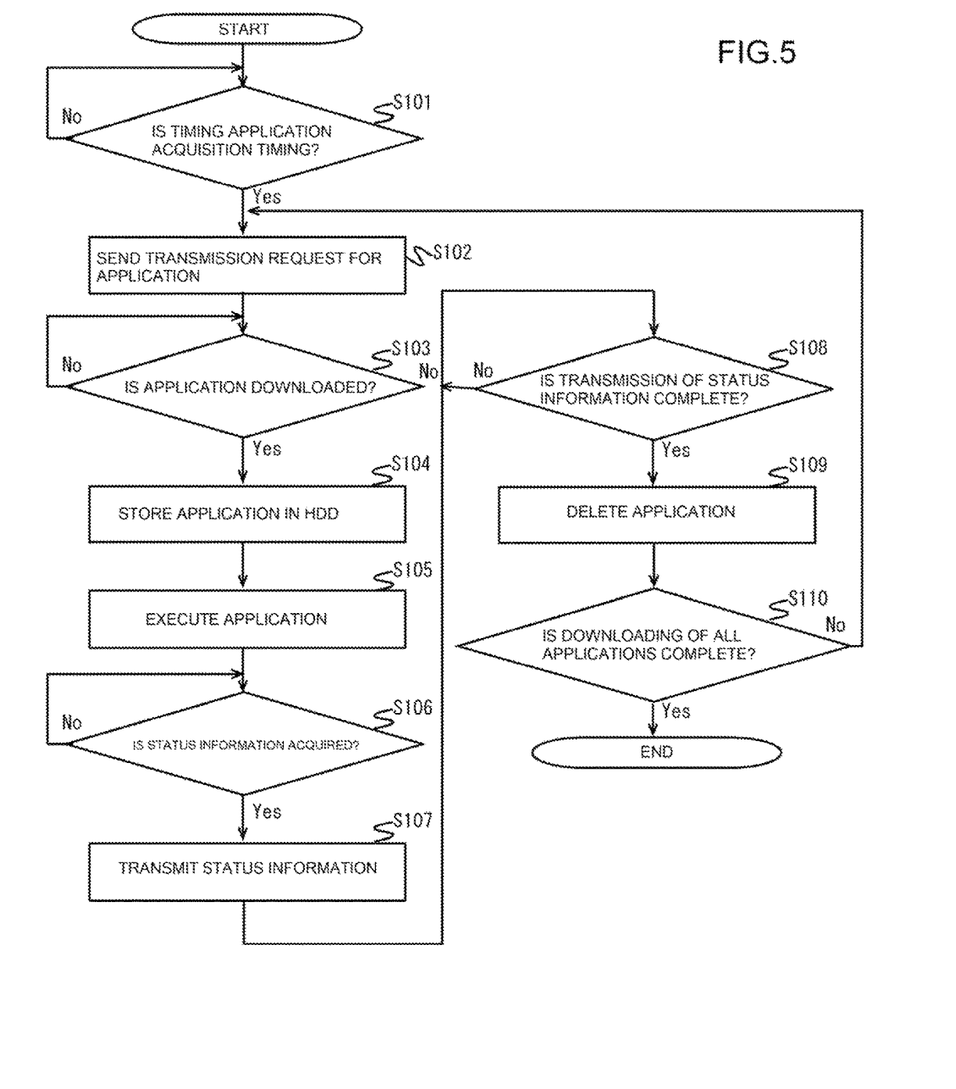
FIG. 5 illustrates steps of a process for acquiring status information by an application on the MFP side in FIG. 1.

Next, the method for acquiring status information by the applications a to e will be explained with reference to FIG. 5. In the following, the case of sequentially downloading applications a, d, e based on the application-acquisition-setting information 117a illustrated in FIG. 4 will be explained.

(Step S101)

The system-control unit 121 determines whether or not the timing is the timing for acquiring applications a, d, e.

In this case, the system-control unit 121 monitors the application-acquisition-setting information 117a that is managed by the status-information-acquisition unit 117, and when the timing is not the acquisition timing (for example, daily at 1:00 pm), determines that the timing is not the acquisition timing for acquiring applications a, d, e (step S101: NO).

However, when the system-control unit 121 monitors the application-acquisition-setting information 117a that is managed by the status-information-acquisition unit 117 and the timing becomes the acquisition timing (for example, daily at 1:00 pm), the system-control unit 121 determines that the timing is the acquisition timing for applications a, d, e (step S101: YES), and processing moves to step S102.

The system-control unit 121 can determine whether or not the timing is the acquisition timing (for example, daily at 1:00 pm) by comparing the time with the time of a clock function that is provided in the MFP 100.

(Step S102)

The system-control unit 121 sends a transmission request for applications a, d, e.

In this case, the system-control unit 121, via the communication-control unit 114, sends a transmission request to the cloud server 200 for applications a, d, e. This is based on the applications a, d, e that are to be acquired and the address information (for example, http://xxx/yyy) of the acquisition destinations of the applications a, d, e included in the application-acquisition-setting information 117a that is managed by the status-information-acquisition unit 117.

At this time, when a transmission request for applications a is received from the MFP 100, the system-control unit 202 on the cloud server 200 side, via the communication-control unit 201, transmits application a that is stored in the storage device 203 to the MFP 100.

The system-control unit 121 performs a download by receiving application a that is transmitted based on the transmission request from the cloud server 200.

(Step S103)

The system-control unit 121 determines whether or not application a is downloaded.

In this case, when there is no notification from the communication-control unit 114 that downloading of application a is complete, the system-control unit 121 determines that application a is not downloaded (step S103: NO).

However, when there is a notification from the communication-control unit 114 that downloading of application a is complete, the system-control unit 121 determines that application a is downloaded (step S103: YES), and processing moves to step S104.

(Step S104)

The system-control unit 121 causes application a to be stored in the HDD 106.

As described above, the downloaded application a may also be stored in the EEPROM 116.

(Step S105)

When application a is stored in the HDD 106, the system-control unit 121 causes the status-information-acquisition unit 117 to execute application a.

In this case, the system-control unit 121 instructs the status-information-acquisition unit 117 to acquire status information of the extension of the MFP 100 based on the application a that is downloaded from the cloud server 200.

At this time, the status-information-acquisition unit 117 executes application a that is stored in the HDD 106, and acquires status information of the extension of the MFP 100 based on application a.

(Step S106)

The system-control unit 121 determines whether or not status information is acquired.

In this case, when there is no notification indicating that acquiring status information from the status-information-acquisition unit 117 is complete, the system-control unit 121 determines that status information is not acquired (step S106: NO).

However, when there is a notification indicating that acquiring status information from the status-information-acquisition unit 117 is complete, the system-control unit 121 determines that status information is acquired (step S106: YES), and processing moves to step S107.

(Step S107)

The system-control unit 121 causes status information to be transmitted.

In this case, the system-control unit 121 causes the communication-control unit 114 to transmit status information that is acquired by the status-information-acquisition unit 117 to the corresponding status-monitoring server 400A to 400C based on the address information (for example, http://aaa/bbb) that is the transmission destination of the status information that is included in application a. Moreover, the system-control unit 121 instructs the communication-control unit 114 to include apparatus-unique information in the status information.

At this time, the system-control unit 202 on the corresponding status-monitoring server 400A to 400C side stores the status information, the apparatus-unique information, and acquisition date and time of the status information that is acquired from the communication control unit 401 in the storage device 403 as status-acquisition information a1 to a3.

(Step S108)

The system-control unit 121 determines whether or not transmission of status information is complete.

In this case, when there is no notification from the communication-control unit 114 indicating that transmission of status information is complete, the system-control unit 121 determines that transmission of status information is not complete (step S108: NO).

However, when there is a notification from the communication-control unit 114 indicating that transmission of status information is complete, the system-control unit 121 determines that transmission of status information is complete (step S108: YES), and processing moves to step S109.

(Step S109)

The system-control unit 121 deletes application a.

In this case, the system-control unit 121 deletes application a that is stored in the HDD 106.

(Step S110)

The system-control unit 121 determines whether or not downloading of all of the applications a, d, e is complete.

In this case, when all of the applications a, d, e that are to be acquired and that are included in the application-acquisition-setting information 117a are downloaded, the system-control unit 121 determines that downloading of all of the applications a, d, e is complete (step S110: YES), and processing ends.

However, when all of the applications a, d, e that are to be acquired and that are included in the application-acquisition-setting information 117a are not downloaded, the system-control unit 121 determines that downloading of all of the applications a, d, e is not complete (step S110: NO), and processing moves to step S102.

After that, the system-control unit 121 sequentially executes the process from step S102 to step S109 for applications d, e. More specifically, the system-control unit 121, in step S102, via the communication-control unit 114, sends a transmission request to the cloud server 200 for application d. This is based on application d that is to be acquired and the address information (for example, http://xxx/yyy) of the acquisition destination of application d that are included in the application-acquisition-setting information 117a.

Moreover, the system-control unit 121, in step S104, causes application d that is downloaded from the cloud server 200 to be stored in the HDD 106. Then, the system-control unit 121, in step S105, instructs the status-information-acquisition unit 117 to acquire status information of the extension of the MFP 100 based on application d that is downloaded from the cloud server 200.

Moreover, in step S108, when transmission of status information based on application d is complete, the system-control unit 121, in step S109, deletes application d that is stored in the HDD 106. Furthermore, the system-control unit 121 moves to step S102 and via the communication-control unit 114 sends a transmission request to the cloud server 200 for application e. This is based on application e that is to be acquired and that is included in the application-acquisition-setting information 117a, and the address information (for example http://xxx/yyy) of the acquisition destination of application e.

Moreover, the system-control unit 121, in step S104, causes application e that is downloaded from the cloud server 200 to be stored in the HDD 106. Then, the system-control unit 121, in step S105, instructs the status-information-acquisition unit 117 to acquire status information of the extension of the MFP 100 based on application e that is downloaded from the cloud server 200.

Moreover, in step S108, when transmission of status information based on application e is complete, the system-control unit 121, in step S109, deletes application e that is stored in the HDD 106. Then, in step S110, when it is determined that downloading of all of the applications a, d, e is complete, the system-control unit 121 ends processing.

In the procedure described above, the case was explained in which, based on the application-acquisition-setting information 117a illustrated in FIG. 4, the applications a, d, e are sequentially downloaded. However, it is also possible to simultaneously download all of the applications a, d, e, and store applications a, d, e in the HDD 106, then acquire status information based on all of the applications a, d, e, and after transmission of all of the status information is complete, delete the applications a, d, e that are stored in the HDD 106.

In this way, in this embodiment, the status-information-acquisition unit 117 executes applications a to e that are stored in the HDD 106 (storage device) and downloaded from the cloud server 200 (application-providing server), and acquires status information of each extension. Then, the system-control unit 121 transmits the status information to the status-monitoring servers 400A to 400C, and deletes the applications a to e that are stored in the HDD 106 (storage device).

As a result, even when the number of extensions increases, it is not necessary to re-create the firmware for acquiring the status information for each respective extension, and it is possible to suppress an increase in the data size of applications that are incorporated in the firmware, so acquiring the status information can be performed in a short time. Also, it is possible to suppress an increase in the capacity of the EEPROM 116 (storage device) that stores the firmware.

In a method of transmitting status information based on schedule information in the typical technology above, the agent unit of an image forming apparatus transmits status information to a remote maintenance server based on both the transmission-schedule information and operating-schedule information when the image forming apparatus is operating. Therefore, on the remote maintenance server side, the possibility of acquiring status information increases.

However, the status information that the image forming apparatus side transmits to the remote maintenance server includes individual information related to the printing function, copying function, FAX function, data transmitting and receiving function via a network and the like of the image forming apparatus, paper count information, and usage information about consumables such as toner and the like. Moreover, the status information is acquired by executing applications that are incorporated in firmware beforehand.

Incidentally, in the image forming apparatus, optional equipment such as a job separator that sorts printed paper, or a finisher that is capable of sorting and stapling each set of printed paper, and the like, for example, may be attached to the image forming apparatus later. Furthermore, customization may be performed accompanying an increase in the size and type of paper that can be printed, and an increase in the colors that are used in color printing. In such cases, there is a problem that in order to acquire the status information of each respective extension, it is necessary to re-create the firmware, and it takes time to acquire the status information.

Moreover, as functions are expanded, the data size of applications that are incorporated in the firmware increases, so there is a problem in that it is necessary to increase the capacity of the storage device such as a EEPROM (Electrically Erasable Programmable Read-Only Memory) and the like that stores the firmware.

With the electronic apparatus and recording medium according to the present disclosure, even when the number of extensions increases, it is not necessary to re-create firmware for acquiring status information of each of the respective extensions, and it is possible to suppress an increase in the data size of applications that are incorporated in the firmware. Therefore, acquiring status information can be performed in a short time, and it is possible to suppress an increase in capacity of a storage device that stores the firmware.

In this embodiment, the case was explained in which an electronic apparatus was applied to an MFP 100, however, the embodiment is not limited to this example, and the electronic apparatus could also be applied to other electronic apparatuses such as a PC (Personal Computer), portable terminal, tablet terminal and the like to which extensions can be added.

What is claimed is:

1. A electronic apparatus, comprising a control unit, wherein
    the control unit comprises a processor and memory, controls operation of the electronic apparatus by executing a control program, and comprises a system-control unit and a status-information-acquisition unit;
    the system-control unit downloads applications from an application-providing server for acquiring status information of each extension on the electronic apparatus;
    the electronic apparatus comprises a storage device that stores the downloaded applications;
    the status-information-acquisition unit executes the applications and acquires status information of the extensions when the downloaded applications are stored in the storage device;
    the system-control unit transmits the status information to a status-monitoring server, and after transmitting the status information, deletes the applications that are stored in the storage device;
    the status-information-acquisition unit manages application-acquisition-setting information that has address information that indicates acquisition destinations of the applications, acquisition timing of the applications, and ID information of the applications to be acquired; and
    the system-control unit monitors the application-acquisition-setting information, and when the current time is the acquisition timing for an application, sends a transmission request to the application-providing server that corresponds to the address information for transmitting the application that corresponds to the ID information.

2. The electronic apparatus according to claim 1, wherein
    the applications include address information that indicates the transmission destination of the status information; and
    the system-control unit transmits the status information to the status-monitoring server that corresponds to the address information.

3. A non-transitory computer readable recording medium that stores an application-control program that can be executed by a computer of an electronic apparatus, and when the application-control program is executed, the computer:
    by a system-control unit, downloads applications from an application-providing server for acquiring status information of each extension on the electronic apparatus;
    by a storage device, stores the downloaded applications;

by a status-information-acquisition unit, executes the applications and acquires status information of the extensions when the downloaded applications are stored in the storage device;

by the system-control unit, transmits the status information to a status-monitoring server, and after transmitting the status information, deletes the applications that are stored in the storage device;

by the status-information-acquisition unit, manages application-acquisition-setting information that has address information that indicates acquisition destinations of the applications, acquisition timing of the applications, and ID information of the applications to be acquired; and by the system-control unit, monitors the application-acquisition-setting information, and when the current time is the acquisition timing for an application, sends a transmission request to the application-providing server that corresponds to the address information for transmitting the application that corresponds to the ID information.

* * * * *